Nov. 14, 1950 L. W. SMITH 2,529,975
METHOD OF MAKING COLOR PRINTS
FROM COLOR TRANSPARENCIES
Filed March 11, 1948 2 Sheets-Sheet 1

LAWRENCE W. SMITH
INVENTOR

BY *[signatures]*
ATTORNEYS

Nov. 14, 1950     L. W. SMITH     2,529,975
METHOD OF MAKING COLOR PRINTS
FROM COLOR TRANSPARENCIES

Filed March 11, 1948     2 Sheets-Sheet 2

LAWRENCE W. SMITH
INVENTOR

BY *[signatures]*
ATTORNEYS

Patented Nov. 14, 1950

2,529,975

UNITED STATES PATENT OFFICE 2,529,975

METHOD OF MAKING COLOR PRINTS FROM COLOR TRANSPARENCIES

Lawrence W. Smith, Rochester, N. Y., assignor to Eastman Kodak Company, Rochester, N. Y., a corporation of New Jersey Application March 11, 1948, Serial No. 14,334

12 Claims. (Cl. 95—2)

This invention relates to photography and particularly to a method for correcting photographic color images on printing.

As is well known in the art, when photographic color prints are made from negative or positive color images, the overall colors of the print frequently do not correspond with those of the subject photographed. This may arise from a number of causes, such as, change in sensitivity of the film on keeping, use of light of incorrect color quality in illuminating the scene by the photographer, errors in processing, and the like. If an exact print is made from such pictures based on the sensitivity which the taking film should have had, that is, under the assumption that the positive or negative transparency is correct, then the print, if a reflection print, will display errors to a greater extent than the transparency, because such prints are nearly always viewed under conditions in which there are comparison objects.

It is possible to make some correction for these errors during the printing, by trial and error, through the use of various filter combinations, if the person who makes the print has seen the original subject and knows what the colors should be. However, where the print is made by a photographer or by operators who have not seen the original subject, such correction cannot be made because there is no way of knowing what the proper color should be.

In U. S. patent application Serial No. 677,973, filed June 20, 1946, R. M. Evans discloses a method of correcting photographic color images upon printing which will overcome the above-mentioned difficulties on the average. His method is based on the discovery that in the average color scene, all of the colors will integrate to gray, or substantially to gray. On this premise, he submits that if in making color prints from a color transparency, the color of the printing light is balanced so as to give colors in the finished print which integrate to gray, then on the average the color print obtained will give the most pleasing color balance although the reproduced colors in the print may not be exactly the same as they are in the original scene.

To obtain this desired result, Evans integrates the light transmitted by a color transparency and adjusts the transmitted light until it is that color as determined by the amount of primary red, green, and blue light therein, which will print substantially gray on the color-sensitive positive material, and then prints with the light as so adjusted. In other words, it might be said that he integrates the color transparency to gray and thus adjusts the color of the printing beam so that the colors in the final print will appear in such proportion that they will integrate to gray or to a neutral shade. Mr. Evans points out that it is not always desirable, either actually or theoretically, to integrate exactly to neutral gray but that it may be desirable, for various reasons, to control the printing beam so that an exact neutral gray would not be produced but that a hue, near gray, would. For example, if the original transparency has an overall yellow base color, it might be desirable to control the color of the printing beam so that it contains an excess of blue to neutralize the yellow color of the base.

While the above-mentioned method of balancing color transparencies during printing results in a print which will be more pleasing in color balance on the average, than those prints made without this correction, it has a certain disadvantage which I have discovered and which my present invention is intended to overcome. For instance, in employing this above-described method of color balancing, the intensity and color of the integrated printing light is adjusted to the same value for every transparency to be printed on a given printing material, namely a color which will produce gray on the printing material. This balancing method therefore tends to produce over-corrected prints from transparencies that differ appreciably from average in density or subject matter. For example, if this method of balancing completely to gray is used with the transparency of a scene including a girl in a red dress standing in front of a red barn, the red will be over-corrected in the direction of cyan (blue green), the color complementary to red, and will appear in the print as less red than in the original, while, at the same time, any cyan in the scene will be over-corrected in the direction of cyan and will appear in the print as more cyan than in the original scene. The same analogy will hold true for seascapes which in the original are predominantly blue, and if integrated to gray in printing will be over-corrected in the direction of yellow, the color complementary to blue.

One object of the present invention is to provide a method of balancing color transparencies during printing which is an improvement over, and overcomes the noted disadvantage of, the method of balancing color transparencies involving integrating the transparency to gray or a hue thereof prior to the actual printing step.

Another object of the present invention is to provide a method of correcting photographic color images during printing which involves the addition of a known amount and quality of diluting light to the light transmitted by the color transparency for integrating purposes, but removing said diluting light from the transmitted light prior to the printing step, whereby instead of correcting the print all of the way to gray it is corrected only a certain percentage of the way to gray.

A further object is to provide a method of correcting photographic color images during printing as described, and wherein the color of the diluting light is adjusted to that color which will cause the color-sensitive positive material when exposed thereby to reproduce as gray.

And yet, another object of the present invention is to provide a method for correcting photographic color images upon printing which will overcome the defects in the photographic images due to incorrect lighting conditions, variations in emulsion sensitivity, and requires no reference to the original subject.

The novel features that I consider characteristic of my invention are set forth with particularity in the appended claims. The invention itself, however, both as to its organization and its methods of operation, together with additional objects and advantages thereof, will best be understood from the following description when read in connection with the accompanying drawings, in which:

Figure 8:
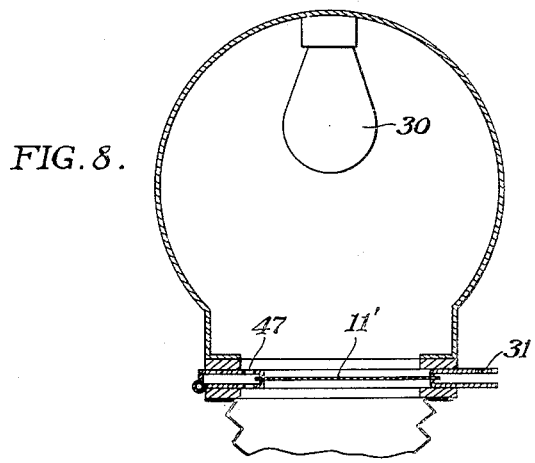
Figure 9:
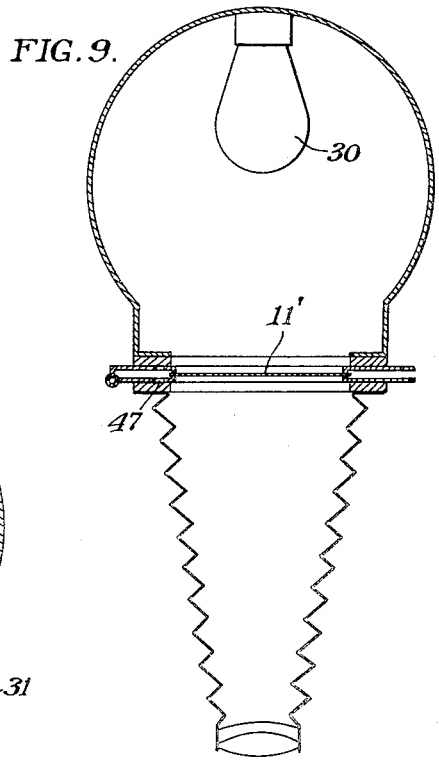

Fig. 8 is a sectional view of the top portion of an enlarger showing the negative carrier in the position it assumes to admit diluting light to the negative transmitted light beam for integrating purposes; and Fig. 9 is a view similar to Fig. 8 and showing the negative carrier slid to the position it assumes during the actual exposure step and wherein the diluting light is cut out of the printing beam.

Like reference characters refer to corresponding parts throughout the drawings.

It is frequently desirable to make natural color prints on an opaque support, that is, color prints which will be viewed by reflected light, or reflection prints, from negative or positive color transparencies. While, so far as I am aware, my invention is not limited to making reflection prints from negative color transparencies, it is in making such prints from such transparencies that the benefits secured by my invention are most noticeable. According to my invention, the negative color transparency is uniformly illuminated by a printing light containing primary red, green, and blue light. Then to the light transmitted by the transparency I add a fixed amount and quality of diluting light. This mixture of transmitted light and diluting light is then integrated so that no subject matter of the transparency is discernible but only the uniform color of the mixed transmitted and diluting lights. The color of this light is then compared with the color of a standard light which will reproduce substantially as gray on the positive printing material when the printing material is exposed thereby and processed in a predetermined manner.

If the color of the integrated light does not match that of the standard light, as will be generally the case except when the color balance of the original scene and, hence, the negative thereof, is perfectly balanced to gray, then the color of the light being integrated is adjusted until it matches that of the standard light. Then the diluting light is removed from the negative transmitted beam of light and the color-sensitive material is exposed with the transmitted beam as adjusted. The color of the diluting light is preferably that which, when transmitted by a transparency of average characteristics, will reproduce substantially as gray on the positive printing material when the printing material is processed in a predetermined manner. It may be desirable, for various reasons, to control the diluting light so that an exact neutral gray would not be produced but a hue near gray. For example, the characteristics of some negative materials may be such that it might be desirable to establish a diluting light such that it contains an excess of light of one or two of the primary colors. At any rate, a diluting light should contain primary red, green, and blue light substantially in proportions such as to print as neutral gray, if not in exactly these proportions. As for the reasons set forth, throughout the specification and claims where the color "gray" is referred to, I mean to include hues near gray, as well as exact neutral gray.

It will thus be understood that my invention differs from the prior art, which teaches the step of integrating the color negative transmitted light to gray prior to making the exposure, in the steps of adding a given amount and quality of diluting light to the transmitted beam prior to integrating it to gray and then removing the diluting light from the adjusted transmitted beam prior to making the exposure. This addition of diluting light modifies the extreme appearance of the integrated light transmitted by transparencies of abnormal density and colored subject matter. In other words, so far as the step of integrating to gray is concerned, the diluting light produces the effect of the color negative transmitting more primary red, green, and blue by the amounts contained in the diluting light than the negative actually transmits. Since this diluting light is removed from the light transmitted by the negative before the exposure is made, the correction introduced thereby remains and appears in the positive print.

Figure 1:
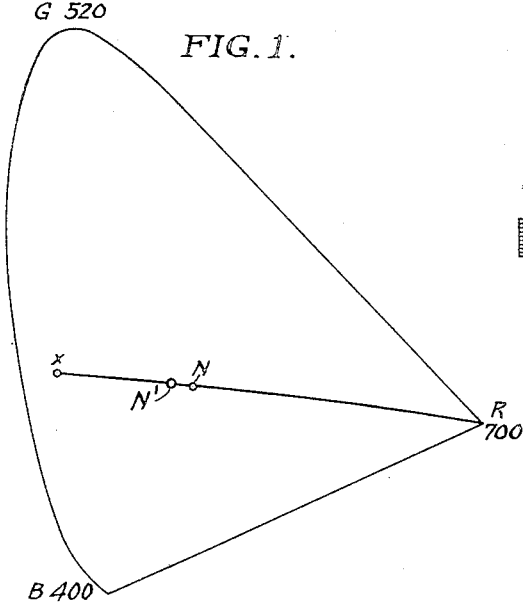
Fig. 1 is an ICI chromaticity diagram to aid in explaining the theory behind the present invention.

The correction resulting from the introduction of this diluting light may be made more apparent by considering a typical example and referring to the ICI chromaticity diagram shown in Fig. 1. Suppose it be assumed that the subject includes a girl in a red dress standing in front of a red barn which is the point of interest and dominates the scene. Obviously, the colors from this scene, when integrated, will appear predominantly red, rather than gray, as assumed by the method of color correction depending upon integrating the scene all of the way to gray. In the negative the red will appear as cyan so that when the light transmitted by the negative is integrated, it will appear cyan as compared with the standard gray light. Referring to the ICI chromaticity diagram of Fig. 1 wherein the boundary line RGB designates the colors of the spectrum and the point N indicates the gray point, if the integrated cyan color of this negative is plotted on this diagram it will appear to the left of the gray point N toward the blue-green portion of the diagram or say at point X.

If this negative is now integrated completely to gray, as suggested by the noted prior art, or point X is pulled all of the way to point N on the diagram, the hues of the transmitted beam must be reduced in cyan (blue green) light, or the red must be appreciably increased. This can be done by increasing the amount of red in the primary, by reducing the amount of cyan light, or both increasing the amount of red and decreasing the amount of cyan light. Regardless of how this adjustment of hue in the transmitted beam is accomplished, the result is that in the final print the reds will appear less red than in the original and the cyan will appear more cyan. Also, when the hue of the transmitted beam is shifted to move the point X to the point N, all of the other colors in the scene will be shifted in the same direction on the diagram by the same amount and such a shift may be undesirable. For instance, inasmuch as the change in the color of the integrated beam necessary to adjust the cyan color X to gray, or to point N, will cause a corresponding shift in all of the other colors in the scene across the diagram in the same direction and by the same amount, it is quite possible that such a shift will cause the flesh-tones of the girl in the scene to print as too blue-green.

By adding a certain amount and quality of diluting light to the negative transmitted light beam before integrating to gray, I, in effect, correct the color balance only part way to gray. Stating it another way, the point X on the chromaticity diagram is moved along the line XN only part way to point N, or to point N'. Inasmuch as the diluting light is removed from the transmitted beam before the exposure is made, it will give a correction in the color balance of the negative in the direction of gray but will result in the red dress and red barn reproducing more nearly the color they appear in the original scene. I have found that integrating only part way to gray, rather than all of the way, results in color prints which are more pleasing in overall color balance and nearer to the actual colors in the original scene than when integrating all the way to gray. This is particularly true with negatives that differ appreciably from average like the example given, or seascapes which are predominantly blue or blue-green.

The fact that the diluting light produces the most noticeable correction in the one color which predominates in a negative is significant in the correction introduced by its use. For example, let us assume that the negative to be printed is the one above mentioned which integrates predominantly cyan and the diluting light is white and contains equal amounts of primary red, green, and blue light. The amounts of red, green, and blue light added to the beam of light transmitted by the negative by the diluting light are such as to produce a hue of gray on the print material. Thus, when the light is integrated, this diluting light will make it appear as though the negative is of such density and color balance as to transmit this added amount of red, green, and blue light. Inasmuch as the negative is actually predominantly cyan, and will thus filter out more red light than blue or green, the amount of red added to the transmitted beam by the diluting light will have more modifying effect on the cyan dye density of the negative than the amounts of green and blue light will have on the magenta and yellow dye densities of the negative. Consequently, when the transmitted light is integrated to gray with this dilution light mixed into the transmitted beam and then the exposure is made with this beam as adjusted, but with the diluting light removed, the final result is integrating only part way to gray or moving the point X in the diagram of Fig. 1 along line XN to point N' instead of all the way to N or gray. In the example scene given this means that the red dress and red barn in the final print is not reduced in red as much at it would have been had the negative been integrated all of the way to gray and, hence, the final red is much more true in color than if the negative were integrated to gray; and, at the same time, the integration has been carried far enough toward gray to give a print having a corrected color balance which is very pleasing.

This improved result will be obtained with any abnormal transparency regardless of in which color the transparency predominates in order to be considered abnormal, as distinguished from a normal transparency wherein the respective colors are in such proportion that they balance to gray or substantially to gray. It will be appreciated that the addition of this diluting light to the beam transmitted by a negative in which the colors are balanced will have no corrective or modifying effect on the color balance of that negative. This is so because such a negative will transmit substantially amounts of red, green, and blue light such as to produce a hue of gray on the print material, and the addition of similar proportions of each of these colors to the transmitted beam will change the effective amount of each color by the same amount. Therefore, only the apparent density of the negative will be changed by the diluting light but not the color balance for integrating purposes. It thus follows that this idea of integrating only part way to gray is readily adapted to all color negatives and is an improvement over the idea of integrating all of the way to gray, for the reason that it has no corrective effect on the color balance of a normal or balanced color negative but its corrective effect becomes more and more noticeable as the unbalance of the colors in a negative increases. It is in these cases of extremely abnormal color negatives that the method of integrating all of the way to gray produces the most undesirable results.

The proper amount and color quality of the diluting light to be used on any particular printing apparatus is preferebly determined by trial methods and, after once being determined, will have to be changed only in quantity or quality in accordance with changes in the color sensitivities of printing materials or negative materials which might be encountered. The recommended technique to be used in determining the proper amount and color quality of the diluting light to be used involves first selecting a representative balanced color negative and representative color negatives which are abnormal in each color which might be encountered; namely one that is too cyan, one that is too magenta, one that is too yellow, etc. Then a print of each of these negatives is made on the positive printing material to be used with a different amount of diluting light being used for each set of prints until the most pleasing balance of colors is obtained in each print of the abnormal negatives without the print from the normal negative becoming over-corrected in density or color balance as compared with an ideal print made from this normal negative without the benefit of diluting light. The quality of the diluting light will be primarily determined by the color sensitivities and characteristics of the process and photographic materials to be used, and the dilution effect of the diluting light for any color can be reduced in accordance with the requirements of the process by placing a density of a complementary color in the diluting beam. Under normal circumstances the diluting light should have been a color which will reproduce as gray or substantially gray on the positive printing material when the material is exposed thereby and processed in the intended manner for reasons, set forth above.

In order to clarify just how the addition of the diluting light for the purposes of integrating the color negative transmitted light to gray modifies the color balance in transparencies of abnormal subject matter, and to give an indication of the limits of diluting light which might be used, we will consider a color negative having a predominance of cyan, as would be the case if the major portion of the subject were the girl in the red dress in front of the red barn, and analyze what happens when correcting this negative all of the way to gray (100% correction) and correcting it only part way to gray according to the present invention where the diluting light is used. To simplify the illustration we will also assume that a photoelectric cell (if such is used for integrating to gray) and the photographic printing materials have the same spectral response as the human eye so that we can talk in terms of lumens of light. Assuming also that correction in color of the integrated light is made only by increasing or decreasing one of the primary colors, using a cyan negative for the example, we will assume the case where only the red light is increased in making the correction, since the light transmitted by a predominantly cyan negative is deficient in red. We will also measure the amount of correction by the amount the red light has to be increased to integrate to gray.

Figure 2:
Fig. 2 is a diagrammatic cross-sectional illustration of a representative color negative used in explaining the theory of operation of the present invention.

To facilitate the analysis of the relative amounts of red, green, and blue light transmitted by the negative in question, let us assume it to be a negative of the form shown at 10 in Fig. 2. This negative 10 shows the three colors as individual patches of magenta, cyan, and yellow, and the area of the magenta and yellow patches are equal to each other and equal to one-half the area of the cyan patch to give the negative the predominant cyan color when integrated. To simplify the example, we will assume that each of the magenta, cyan, and yellow patches of this negative act as perfect filters for the complementary colors, green, red, and blue, respectively.

If we now assume that this negative 10 is uniformly illuminated with one lumen of "white" light, which is made up of $1/3$ lumen primary red, $1/3$ lumen of primary green, and $1/3$ lumen of primary blue light, the magenta area being $1/4$ of the total area of the negative will transmit $1/4$ of the $1/3$ lumen of red light incident on the negative, or $1/12$ lumen of red light. The cyan area will transmit no red light and the yellow area will transmit $1/12$ of a lumen of red light. This means that in the transmitted beam there will appear $2/12$ of a lumen of red. Now considering the amount of the $1/3$ lumen of green light which is transmitted by the negative, the magenta area will transmit none, the cyan area will transmit $2/12$ lumen (because its area is one-half of that of the entire negative), and the yellow area will transmit $1/12$ lumen. This gives a total of $3/12$ of a lumen of green light transmitted by the negative. Now considering the amount of the $1/3$ lumen of incident blue light which will be transmitted by the negative, the magenta area will transmit $1/12$ lumen, the cyan area will transmit $2/12$ lumen, and the yellow area will transmit none. This gives a total transmission of $3/12$ of a lumen of blue light. It will thus be seen that the transmitted beam of light contains $2/12$ lumen of red, $3/12$ lumen of green, and $3/12$ lumen of blue light.

If this negative is to be integrated all of the way to gray in accordance with the prior art, it means that the ratio of these three transmitted colors must be changed as follows:

$$2/12 : 3/12 : 3/12 \text{ to } 1:1:1$$

Such a change requires that the incident light be made more red. By changing the color of the incident light so that it contains $1/2$ lumen of red, $1/3$ lumen of green, and $1/3$ lumen of blue, it will follow that the amount of red transmitted by the magenta area will now be $1/4 \times 1/2$ lumen or $1/8$ lumen of red; none transmitted by the cyan area, and $1/8$ lumen transmitted by the yellow area. Now the total amount of red light transmitted is $3/12$ of a lumen and the three colors are transmitted in the ratio of $1:1:1$. Accordingly, since the amount of red in the incident beam had to be raised from $1/3$ lumen to $1/2$ lumen to integrate completely to gray, it follows that $1/6$ more lumen of red was needed to give 100% correction.

Now suppose in accordance with the present invention we add $1/20$ of a lumen of white diluting light to the beam transmitted by the negative 10 when illuminated with one lumen of white light. Since this $1/20$ of a lumen of white diluting light is made up of $1/60$ lumen of red, $1/60$ lumen of green, and $1/60$ lumen of blue, to find the total amount of each color in the transmitted beam we must add $1/60$ lumen to each of the values determined above. Accordingly, the amount of red light in the transmitted beam will be $$2/12 + 1/60 = 11/60$$

the amount of green will be $3/12 + 1/60 = 16/60$, and the amount of blue will be $3/12 + 1/60 = 16/60$. This means that the beam of transmitted light plus diluting light will strike the integrating means (photocell or photometer) and will contain red, green, and blue light in the following proportion: $11/60 : 16/60 : 16/60$.

In order to integrate this light to gray, there will be required $16/11 \times 1/3 = 16/33$ lumen of red to 1/3 lumen of green to 1/3 lumen of blue in the incident light, or the red light in the incident beam must be increased by $5/33$ of a lumen. Considering that the amount of red light in the incident beam had to be increased by $1/6$ of a lumen to integrate to gray without benefit of diluting light, the present increase of $5/33$ of a lumen is only 90.9% of $1/6$ ($5/33 \times 6/1 = 30/33 = .9090$). It can thus be said that if an amount of diluting light equal to $1/20$, or 5%, of the amount of light incident on the negative is used, then 90.9% of full color correction is obtained.

Now suppose in accordance with the present invention we add 20 lumens of white diluting light to the beam transmitted by the negative 10 when illuminated with one lumen of white light. Since these twenty lumens of white diluting light is made up of $20/3$ lumens of red, $20/3$ lumens of green, and $20/3$ lumens of blue light, to find the total amount of each color in the transmitted beam we merely add $20/3$ lumens to each of the values obtained above. Accordingly, the amount of red light in the transmitted beam will be $2/12 + 20/3 = 82/12$ lumens. The amount of green will be $3/12 + 20/3 = 83/12$ lumens, and the amount of blue light will be $3/12 + 20/3 = 83/12$ lumens. This means that the beam of transmitted light plus diluting light which will be integrated to gray will contain red, green, and blue light in the following proportion: $82/12 : 83/12 : 83/12$. In order to integrate this light to gray requires $$83/82 \times 1/3 = 83/246$$

lumen of red to 1/3 lumen of green to 1/3 lumen of blue in the incident light, or the red light in the incident beam must be increased by $1/246$ of a lumen. As compared with the $1/6$ lumen increase in red required to integrate all of the way to gray without diluting light, the present increase of $1/246$ of a lumen is only 2.4% of $1/6$. It can thus be said that if an amount of diluting light equal to twenty times, or 2000%, of the amount of light incident on the negative is used, then 2.4% of full-color correction is obtained. While a 2.4% correction clearly distinguishes from the prior art where no correction at all is made, it must be pointed out that such a correction would probably be so small as not to be noticeable in the final print. For all practical purposes probably an amount of diluting light more than ten times the light incident on the negative would not be used, but the last example given clearly shows that a correction will be obtained even with twice this amount of diluting light and that this limit is within the scope of the present invention.

My invention is applicable to printing apparatus wherein the step of integrating toward gray the light beam transmitted by the color negative is done by means of photoelectric cells, or apparatus where the integrating toward gray of the transmitted beam is done visually. In the first instance the red, green, and blue light of the negative transmitted beam are integrated and adjusted individually, while in the latter case the three colors can be integrated simultaneously or as a mixture.

Figure 3:
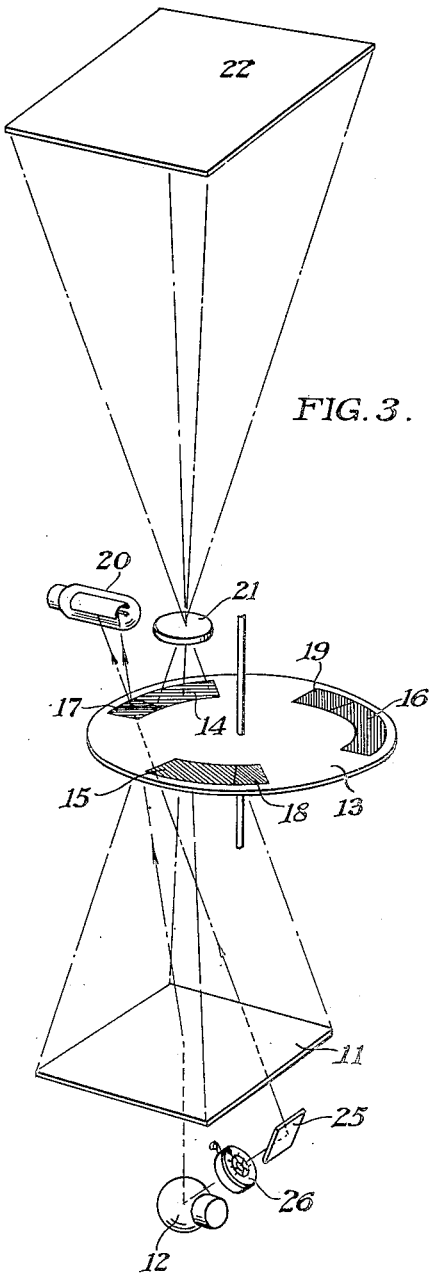
Fig. 3 is one form of printing apparatus for carrying out the present invention automatically.

Referring now to Fig. 3 a photographic color transparency which I have represented as a negative 11 is illuminated with a lamp 12 in such a way that a negative receives uniform illumination throughout its entire area. This is common practice in photographic printers. At a distance from the transparency 11 there is a means which I have represented as a rotatable disk for inserting a plurality of color filters in the printing beam. These filters may be attached to the disk 13 in such a manner that they can be successively inserted into the printing beam. There are three filters representing the primary colors and each of the filters is in two sections for a reason to be explained hereinafter. The sections 14, 15, and 16 of the filters are used for printing onto the positive print material and the sections 17, 18, and 19 are used for integrating and measuring the light transmitted by the transparency 11. With the filters in the position shown in Fig. 3, for example, the light from the transparency 11 passes through filter 17 to a photoelectric cell 20 which integrates and measures the intensity of the light of the color of filter 17. In successive positions of the disk 13 the photocell 20 measures the color of the light passing through the filter 18 and through filter 19.

The printing light beam from the transparency 11 also passes through filters 14, 15, and 16 in succession and is focused by an optical system represented by a lens 21 onto the printing paper 22. The quantity or intensity of the light passed through each of the primary color filters 14, 15, and 16 is controlled according to the outputs or measurements of the photoelectric cell 20, so that the resulting light, if not focused by the lens system of the printer on the printing material 22, would produce a substantially neutral gray image on the printing material.

The filters 14, 15, and 16 used in the printing light beam may be any suitable filters, such as ordinarily used in making color separation negatives and suitable for the print material used. For example, the blue filter may be a Wratten No. 47 filter, the green filter a Wratten No. 57—A, and the red filter a Wratten No. 25 filter. Filters 17, 18, and 19 which filter the light passing to the photocell 20 are likewise blue, green, and red filters, although their absorption properties will generally be different from those of the projection printers because of the difference between the spectral sensitivity characteristics of the photocell 20 and the print material 22. The photocell 20 must obviously be somewhat sensitive to blue, green, and red light and it is generally desirable to include in filters 17, 18, and 19 an infrared absorbing material because of the high infrared sensitivity of most photocells. It has been found in practice that the filters used in the photocell beam need not have transmission peaks corresponding exactly to the absorption peaks of the dyes of the original transparency. This is because greater or less change can be made in the transmitted light, thereby varying the correction secured by shifting the transmission peak of the filter relative to the absorbing peak of the dye being measured. This does not, however, change the theory of operation of the apparatus disclosed or the method of printing carried out thereby.

A printer which may be used in the manner described is disclosed in Tuttle and Brown U. S. application Ser. No. 668,800, filed May 10, 1946.

Coming to the present invention the means for introducing the diluting light into the beam transmitted by the transparency for purposes of integrating to gray may take several different forms. The only limitation there is on the manner in which this diluting light is introduced is that the diluting light must be subject to the same changes in quality as the light illuminating the negative is during the step of integrating to gray. In other words, the diluting light cannot be introduced into the negative transmitted beam at such a point that its quality will remain constant while the negative transmitted light is integrated to gray. If this were true, the negative would also be integrated completely to gray or corrected 100% despite the presence of the diluting light during the adjusting step.

In Fig. 3 I have shown the diluting light as a beam from the lamp 12 coming around the edge of the negative 11 and being reflected into the negative transmitted beam by a mirror 25 so that it will strike the photocell 20 along with the transmitted beam. An ordinary between-the-lens type of shutter 26 can be placed in front of the mirror 25 so that the amount of diluting light can be adjusted by the diaphragm of the shutter. After the step of integrating to gray has been completed, and before the printing step is undertaken with the transmitted beam as adjusted, the shutter 26 must be operated to cut off the diluting light from the negative transmitted beam. Inasmuch as the intensity of the lamp 12 is varied in integrating to gray, the quality of the diluting light will be subject to the same changes as the light transmitted by the negative. If it is found necessary to adjust the quality of the diluting light in accordance with the color sensitivity characteristics of the photographic materials or process being used, this can be done by placing suitable color filters in front of the shutter 26.

Figure 4:
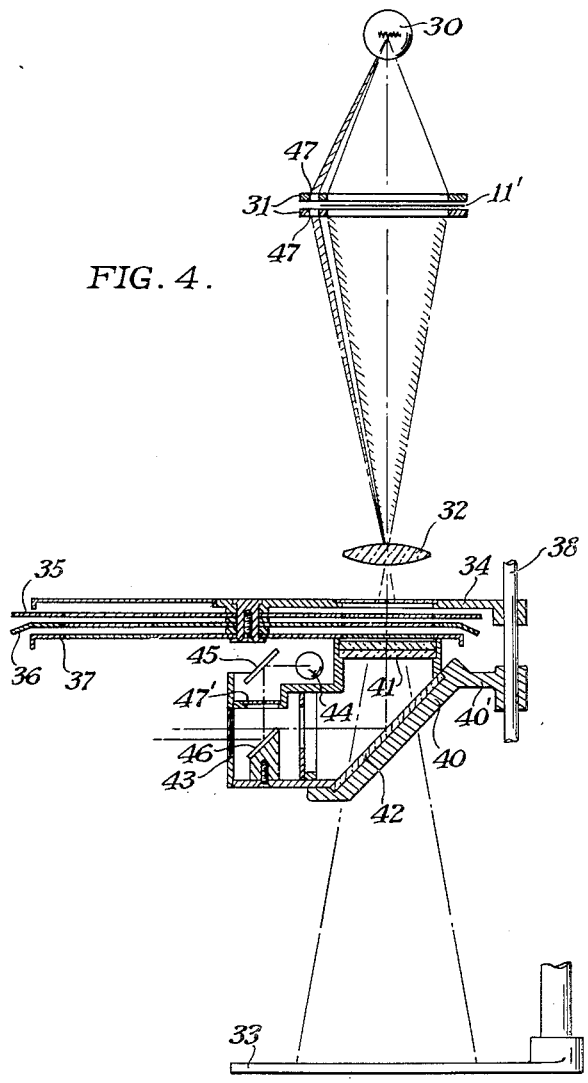
Fig. 4 is another embodiment of printing apparatus for carrying out the method of the present invention and wherein the integration and matching of the integrated beam is carried out visually.

In Fig. 4 I have shown an arrangement of parts which permits this method of making and correcting color prints to be carried out on a conventional enlarger, and wherein the step of integrating toward gray is done visually so that all three colors in the negative transmitted beam are integrated and adjusted simultaneously. As shown, an enlarger may consist of the conventional parts including a printing lamp 30 which uniformly illuminates the color negative 11' held flat in a negative carrier 31, and the light transmitted by the negative is focused by a lens system 32 onto an easel 33 which will support the color-sensitive positive printing material. A color attachment which is to be placed on the enlarger to make it possible to make color prints will consist of a supporting arm 34 on which are rotatably mounted three filter disks 35, 36, and 37. One of these disks (35, for example) carries a plurality of circumferentially spaced red filters of different density plus a clear opening, while one of each of the other disks will carry a plurality of green and/or blue filters of different densities plus a clear opening. These disks are so arranged that by rotating them, the color filters of different density or the clear opening therein can be moved into alignment with the beam transmitted through the negative. The arm 34 is shown as supported from a post 38 which may be attached to the enlarger lamphouse, not shown.

Disposed below the filter disks is a photometer indicated generally at 40 for integrating the negative transmitted light and comparing its color with the color of a standard patch of light. This photometer includes a bracket 40' which is rotatably supported on the post 38 so that the photometer may be moved into the enlarger beam, as shown, for integrating the color negative and can then be moved out of the enlarger beam during the exposure step.

This photometer includes a window in its top wall through which the enlarger beam enters and in alignment with this window there is a light-integrating means 41 so that the colors in the negative transmitted beam are completely mixed and the image of the negative is obliterated. This integrating means may take different forms, but I have found that a pair of Fresnel lenses with a piece of clear lenticular film between them provides a most satisfactory integrating means. The integrated light is reflected by a mirror 42 toward a comparison window 43 in the side wall of the photometer housing.

Figure 5:
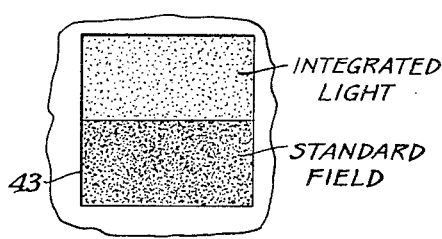
Fig. 5 shows, on an enlarged scale, how the comparison windows of the photometer of Fig. 4 appears to the operator.

The standard color patch of the photometer is formed by light from a light source 44 of known and fixed intensity which is transmitted through a suitable filter pack, 47', and is reflected by mirrors 45 and 46 into the comparison window 43 in side-by-side relation with the integrated light coming from the negative. Inasmuch as the mirror 46 cuts off the lower half of the integrated light beam, the view as seen in the comparison window 43 is like that shown in Fig. 5, where the lower half is the standard field and the upper half is the field of integrated light. Filters 47 are inserted into the light beam from the standard source of light to make the comparison or standard field appear as a uniform field of a color which will reproduce as gray or substantially gray on the positive printing material, if the latter is exposed thereby, as fully described above. Filters are placed over the window 43 to make this standard half of the field appear visually neutral. Thus, at balance, both halves of the field will appear neutral.

Figure 6:
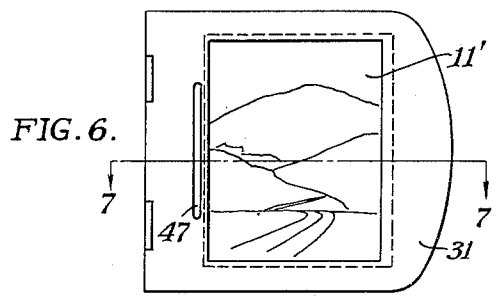
Fig. 6 is a plan view of a loaded negative carrier equipped with a slot for admitting diluting light to the negative transmitted beam of the printer.
Figure 7:
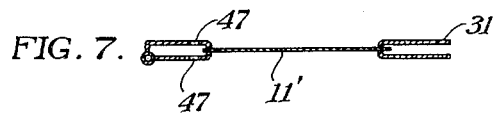
Fig. 7 is a scetional view taken substantially on line 7—7 of Fig. 6.

For introducing diluting light into the negative transmitted beam in accordance with the present invention, I have shown both halves of the negative carrier 31 provided with a slot 47 through which light from the lamp 30 may pass around the edge of the negative. As shown in Figs. 6 and 7, the slot in the negative carrier is made as close as possible to the exposure frame of the negative carrier so that when the negative carrier is moved to the position shown in Fig. 8, the slit is moved into the light beam and the greater part of the negative remains in the beam also. This is the position the negative carrier should be in for the step of integrating the negative to gray. After the negative has been integrated to gray, the negative carrier is slid to the position shown in Fig. 9 in which the slot 47 is moved out of the light beam and the diluting light is thus removed from the printing beam, and then the printing material is exposed with the printing beam as adjusted. It will be appreciated that the photometer is also swung out of the light beam before the exposure is made. Rather than having the negative carrier moved between two positions in order to introduce and remove the diluting light into and from the enlarger beam, respectively, the slot 47 may be left in a position to be illuminated by the printing lamp and be provided with a slidable shutter which would move between two positions to cover and uncover the slot, if desired.

The use of this color attachment in making a corrected color print according to the present invention will now be described. First, the color negative 11' to be printed is placed in the negative carrier, being sure that it does not cover the slot 47, and the negative carrier 31 is moved to the position in which the slot 47 admits diluting light to the printing beam. Now with the photometer swung into the enlarger beam, by looking into the window 43 thereof, the color of the integrated negative transmitted light is compared with the color of the standard field. If the integrated light does not match the standard field in color then the proper ones of the filter disks 35, 36, and 37 are adjusted to change the color of the printing beam in the direction necessary to match the two fields in the window 43. For instance, if the integrated transmitted light appears too cyan (blue-green) in comparison with the standard field, this indicates a lack of red in the transmitted beam and the cyan filter disk 37 is adjusted to allow more red in the transmitted beam. Or, the same result may be obtained by cutting down on the blue and green light in the transmitted beam by adjusting filter disks 35 and 36 to points of higher densities of yellow and magenta filters. After the integrated transmitted beam has been matched in color with the standard field by the proper adjustment of the filters 35, 36, and 37, then the exposure is ready to be made. Before this is done, the negative carrier is slid to the position shown in Fig. 9 to cut the diluting light from the printing beam and then the photometer is swung out of the printing beam and the color-sensitive positive printing material is placed on the easel.

The quantity of diluting light admitted to the negative transmitted light beam may be varied by changing the size of the slot 47 in the negative carrier. The color quality of the diluting beam may be adjusted in accordance with the color sensitivity of the photographic materials and process used in making the color print by placing suitable filters over the slot 47. The quantity and quality of the diluting light, after once being adjusted for a given printing material having certain color sensitivity characteristics, will not have to be changed so long as that printing material is used. A change in the quality and/or quantity of diluting light will, however, probably be in order if a printing material is used having different color-sensitivity characteristics. The character of the change required can be readily determined by comparing color prints made from a balanced color negative on both of these printing materials with the diluting light as adjusted for use with the first printing material.

Although I have shown and described certain specific embodiments of the present invention, I am aware that many modifications thereof are possible. My invention, therefore, is not to be limited to the precise steps and details of construction shown and described, but is intended to cover all modifications coming within the scope of the appended claims.

Having thus described my invention, what I claim is new and desire to secure by Letters Patent of the United States is:

1. The method of printing a multi-color transparency containing a negative color image onto a photographic printing material whose sensitivty lies in three different regions of the spectrum, which comprises uniformly illuminating said transparency with light which contains energy in said three regions of the spectrum, introducing into the beam of light transmitted by said transparency a given quantity of diluting light containing energy in said three regions of the spectrum and having a color composition which would cause said printing material to reproduce substantially as gray if exposed solely thereto, integrating the light transmitted through the transparency and the diluting light introduced therein, determining the hue and amount by which said integrated light departs from light which will print gray on said printing material, adjusting the color of said light being integrated until the integrated light has the same printing characteristics for said printing material as light which will print gray on said printing material, eliminating the diluting light from the beam transmitted by the transparency, and then focusing and printing said transparency onto the printing material with the transmitted beam as so adjusted.

2. The method of printing a multi-color transparency containing a negative color image onto a photographic printing material whose sensitivity lies in three different regions of the spectrum which comprises uniformly illuminating said transparency with light which prints substantially as gray on the printing material, mixing a known quantity of diluting light, which contains energy in said three regions of the spectrum in such proportion as would cause said printing material to reproduce substantially as gray if exposed solely thereto, into the light beam transmitted by said transparency, integrating the mixture of the light transmitted through the transparency and the diluting light, determining the color and amount by which said integrated light departs from light which will print gray on said printing material, adjusting the intensity of the printing light so that when integrally passed through said transparency and mixed with said diluting light it has the same printing characteristics as the light which prints gray on said printing material, removing the diluting light from the beam transmitted by the transparency, then focusing and printing said transparency onto said printing material with said transmitted beam of light.

3. The method of printing a multi-color transparency containing a negative color image onto a photographic printing material whose sensitivity lies in three different regions of the spectrum, which comprises illuminating the printing material plane with light which would produce substantially gray density on the printing material, passing said light through the multi-color transparency, adding to the beam transmitted integrally through the transparency a known quantity of diluting light which contains energy in said three regions of the spectrum and having a color composition which would cause said printing material to reproduce substantially as gray if exposed solely thereto, integrating the transmitted light as diluted, adjusting the color of the beam transmitted by the transparency until the color of the integrated light is such that it has the same printing characteristics on the printing material as the light illuminating said transparency, removing said diluting light from the transmitted beam, and then focusing and printing said transparency onto the printing material with the transmitted beam as so adjusted.

4. The method of printing from a multi-color negative transparency onto a color sensitive positive material which reproduces as gray a certain color of exposing light incident thereon and composed of a mixture of red, green, and blue light, each of a certain intensity, said method comprising illuminating the transparency with light which contains primary red, green, and blue light, isolating each of the red, green, and blue light transmitted by said transparency, adding to each of the red, green, and blue transmitted light a quantity of diluting light which contains primary red, green, and blue light, separately integrating the red, green, and blue transmitted light along with said diluting light, determining the color and amount by which said integrated lights depart from said red, green, and blue light of said certain intensity, adjusting the intensity of each of said red, green, and blue transmitted light being integrated to the point at which said integrated transmitted colored light including said diluting light matches said certain intensity of the red, green, and blue making up light of said certain color, removing the diluting light from the red, green, and blue transmitted light, and then exposing said color sensitive positive material by the red, green, and blue transmitted lights as so adjusted.

5. The method of printing from a multicolor negative transparency onto a color sensitive positive material according to claim 4, in which the intensities of each of the red, green, and blue lights transmitted by the transparency are adjusted individually and successively, and the exposing of the color sensitive positive material by the red, green, and blue lights as adjusted is effected successively and immediately after each color of transmitted light is adjusted.

6. The method of printing from a multicolor negative transparency onto a color sensitive positive material according to claim 4, in which the diluting light added to the red transmitted beam is a quantity of red light of said certain intensity, that added to the transmitted green beam is a quantity of green light of said certain intensity and that added to the transmitted blue beam is a quantity of blue light of said certain intensity.

7. The methol of printing from a multicolor negative transparency onto a color sensitive positive material according to claim 4, in which the quantity of diluting light added is equal in amount to between 5 and 20 times the amount of light transmitted by the transparency.

8. The method of printing from a multicolor negative transparency onto a color sensitive positive material according to claim 4, in which said diluting light is passed through one or more color filters prior to being added to the transmitted light which makes it said certain color which causes said color sensitive positive material to reproduce as gray when exposed thereby.

9. The method of printing from a multicolor negative transparency onto a color sensitive positive material which reproduces as gray a certain color of exposing light incident thereon and which method comprises uniformly illuminating the transparency with light which contains primary red, green, and blue light, adding to the beam of light transmitted by said transparency a quantity of diluting light which contains primary red, green, and blue light in such proportion as would cause said printing material to reproduce substantially as gray if exposed solely thereto, integrating the primary red, green, and blue light transmitted by the transparency along with said diluting light, determining the color and amount by which said integrated light departs from light of said certain color, adjusting the hue of said light being integrated to the point at which said integrated transmitted light including said diluting light also has said certain color, removing the diluting light from the light transmitted by the transparency, and then exposing said color sensitive positive material by the transmitted light as so adjusted.

10. The method of printing from a multicolor negative transparency onto a color sensitive positive material according to claim 9, in which said diluting light is passed through one or more color filters which makes it said certain color which will cause said color sensitive positive material to reproduce as gray when exposed thereby.

11. The method of printing from a multicolor negative transparency onto a color sensitive positive material which reproduces as gray a certain color of exposing light incident thereon and which method comprises uniformly illuminating the transparency with light which contains primary red, green, and blue light, adding to the beam of light transmitted by said transparency a quantity of diluting light which contains primary red, green, and blue light, integrating the primary red, green, and blue light transmitted by the transparency along with said diluting light, visually comparing said integrated light with a standard patch of light of said certain color to determine the color and amount by which the two vary, adjusting the hue of said light being integrated to the point at which the color of said integrated light matches that of said standard patch by inserting color filters into the beam of light being integrated, removing the diluting light from the light transmitted by said transparency, and then exposing said color sensitive positive material by the transmitted light as so adjusted.

12. The method of printing from a multicolor negative transparency onto a color sensitive positive material according to claim 11, in which said diluting light is obtained by directing a quantity of said light illuminating said transparency around said transparency and into said transmitted beam and interposing color filters into said diluting beam prior to its introduction into said transmitted beam to render it said certain color.

LAWRENCE W. SMITH.

REFERENCES CITED

The following references are of record in the file of this patent:

UNITED STATES PATENTS

| Number | Name | Date |
|---|---|---|
| 2,117,727 | Jones | May 17, 1938 |
| 2,231,669 | Hall | Feb. 11, 1941 |
| 2,269,161 | Morse | Jan. 6, 1942 |
| 2,326,500 | Schneider et al. | Aug. 10, 1943 |
| 2,388,842 | Hanson | Nov. 13, 1945 |
| 2,402,660 | O'Grady | June 25, 1946 |

FOREIGN PATENTS

| Number | Country | Date |
|---|---|---|
| 409,287 | Great Britain | Apr. 23, 1934 |
| 486,043 | Great Britain | May 30, 1938 |